US010071925B2

(12) United States Patent
Hansen et al.

(10) Patent No.: US 10,071,925 B2
(45) Date of Patent: Sep. 11, 2018

(54) INDUCED SLUDGE BED ANAEROBIC REACTOR

(71) Applicants: Conly L. Hansen, North Logan, UT (US); Lared D. Hansen, Brigham City, UT (US)

(72) Inventors: Conly L. Hansen, North Logan, UT (US); Lared D. Hansen, Brigham City, UT (US)

(*) Notice: Subject to any disclaimer, the term of this patent is extended or adjusted under 35 U.S.C. 154(b) by 28 days.

(21) Appl. No.: 15/253,727

(22) Filed: Aug. 31, 2016

(65) Prior Publication Data
US 2018/0057381 A1 Mar. 1, 2018

(51) Int. Cl.
*C02F 3/28* (2006.01)
*C02F 103/22* (2006.01)

(52) U.S. Cl.
CPC .......... *C02F 3/2866* (2013.01); *C02F 3/2846* (2013.01); *C02F 2103/22* (2013.01); *C02F 2203/006* (2013.01)

(58) Field of Classification Search
CPC .. C02F 3/2866; C02F 3/2846; C02F 2103/22; C02F 2203/006
USPC ........................................ 210/173, 603, 608
See application file for complete search history.

(56) References Cited

U.S. PATENT DOCUMENTS

| | | |
|---|---|---|
| 2,586,739 A | 2/1952 | Summers |
| 2,647,733 A | 8/1953 | Knowles |
| 2,680,602 A | 6/1954 | Nelson |
| 2,889,929 A | 6/1959 | Kivell |
| 3,184,065 A | 5/1965 | Bradford |
| 3,622,009 A | 11/1971 | Bordner |
| 3,705,648 A | 12/1972 | Arvanitakis |
| 3,787,316 A | 1/1974 | Brink |
| 3,837,493 A | 9/1974 | Lin |
| 3,965,013 A | 6/1976 | Jackson |
| 3,988,026 A | 10/1976 | Kemp |
| 4,003,398 A | 1/1977 | Duveau |
| 4,062,549 A | 12/1977 | Kemp |
| 4,208,279 A | 6/1980 | Varani |

(Continued)

FOREIGN PATENT DOCUMENTS

| | | |
|---|---|---|
| DE | 10314933 A1 | 10/2004 |
| JP | 64-22398 A | 1/1989 |

(Continued)

*Primary Examiner* — Fred Prince
(74) *Attorney, Agent, or Firm* — L. Alan Collins; Collins & Collins Intellectual, LLC

(57) ABSTRACT

An induced sludge bed anaerobic reactor includes a vessel in which a septum is positioned to maintain solids in wastewater being treated toward a lower portion of the reactor. The septum is configured to prevent or minimize rising bacteria from exiting the vessel and to minimize clogging of the vessel. A first example septum is disclosed that is based on a linear vane design. A second example septum is disclosed that is based on a concentric vane design. A third example septum is disclosed that is based on a radial vane design that may include one or more sections. Further, septums may be layered one atop another to further minimize rising bacteria from exiting the vessel and to further minimize clogging of the vessel. Finally, a septum is attached to the inside of the vessel so as to allow it to move allowing any clogging waste floating under the septum to exit the vessel.

20 Claims, 9 Drawing Sheets

(56) References Cited

U.S. PATENT DOCUMENTS

| | | |
|---|---|---|
| 4,302,329 A | 11/1981 | Pfefferkorn |
| 4,350,588 A | 9/1982 | Tsubota |
| 4,354,936 A | 10/1982 | Ishida |
| 4,372,856 A | 2/1983 | Morrison |
| 4,396,402 A | 8/1983 | Ghosh |
| 4,519,848 A | 5/1985 | Underwood |
| 4,609,460 A | 9/1986 | Vellinga |
| 4,696,746 A | 9/1987 | Ghosh |
| 4,696,747 A | 9/1987 | Verstraete |
| 4,758,344 A | 7/1988 | Wildenauer |
| 4,822,056 A | 4/1989 | Bowers |
| 4,840,732 A | 6/1989 | Rawlins |
| 4,919,813 A | 4/1990 | Weaver |
| 5,039,111 A | 8/1991 | Kemp |
| 5,143,625 A * | 9/1992 | Ballard ............... B01D 21/0045 210/195.3 |
| 5,338,447 A | 8/1994 | Vellinga |
| 5,409,610 A | 4/1995 | Clark |
| 5,441,634 A | 8/1995 | Edwards |
| 5,464,539 A | 11/1995 | Ueno |
| 5,507,946 A | 4/1996 | Stearns |
| 5,529,692 A | 6/1996 | Kubler |
| 5,660,724 A | 8/1997 | Pollock |
| 5,747,311 A | 5/1998 | Jewell |
| 5,798,043 A | 8/1998 | Khudenko |
| 5,866,002 A | 2/1999 | Yates |
| 6,063,273 A | 5/2000 | Habets |
| 6,193,409 B1 | 2/2001 | Brunson |
| 6,416,993 B1 | 7/2002 | Wexler |
| 6,592,751 B2 | 7/2003 | Haridas |
| 6,613,562 B2 | 9/2003 | Dvorak |
| 6,860,996 B2 | 3/2005 | Noike |
| 6,911,149 B2 | 6/2005 | Hansen |
| 6,916,025 B2 | 7/2005 | Brisson |
| 7,022,293 B2 | 4/2006 | Hogan |
| 7,290,669 B1 | 11/2007 | Hansen |
| 7,452,467 B2 | 11/2008 | Hansen |
| 7,540,961 B2 | 6/2009 | Hansen |
| 7,615,155 B1 | 11/2009 | Hansen |
| 7,699,976 B2 | 4/2010 | Hansen |
| 7,727,396 B1 | 6/2010 | Hansen |
| 2002/0117443 A1 | 8/2002 | Bailey |
| 2005/0064567 A1 | 3/2005 | Lay |
| 2005/0194310 A1* | 9/2005 | Yamamoto ............ C02F 3/1268 210/605 |
| 2006/0060524 A1 | 3/2006 | Chynoweth |
| 2006/0065593 A1 | 3/2006 | Hansen |
| 2006/0289355 A1 | 12/2006 | Hansen |
| 2009/0123965 A1 | 5/2009 | Wahl |
| 2010/0133176 A1 | 6/2010 | Hansen |
| 2011/0100902 A1* | 5/2011 | Bluvol ...................... C02F 3/28 210/601 |
| 2012/0006744 A1* | 1/2012 | Phattaranawik ........ C02F 3/301 210/605 |

FOREIGN PATENT DOCUMENTS

| | | |
|---|---|---|
| JP | 2002-061752 A | 2/2002 |
| JP | 2003-071498 A | 3/2003 |
| JP | 4001507 B2 * | 10/2007 |

* cited by examiner

INDUCED SLUDGE BED ANAEROBIC REACTOR

BACKGROUND

Wastewater treatment has always been important, particularly in agricultural production and food processing, which produces wastewater containing high concentrations of organic matter.

Anaerobic digestion is one method of treating wastewater containing high concentrations of organic matter. Through anaerobic digestion, large quantities of organic matter are removed from the wastewater by converting the organic matter into biogas. Anaerobic digestion is particularly suitable for wastewater from agricultural production and processing.

Inducing a sludge blanket or sludge bed (the terms "bed" and "blanket" are used interchangeably throughout this disclosure) has long been recognized as a way to promote high-rate anaerobic digestion. A sludge bed is used to retain anaerobic microorganisms—the most numerous of which are bacteria in a designated space. One prior method of establishing such a sludge bed is to utilize a so-called up-flow anaerobic sludge blanket (UASB), which causes a sludge blanket to form over time inside a bioreactor. There are many problems, however, with respect to prior UASBs. One significant problem with conventional UASB bioreactors relates to plugging of the gas/solid/liquid separator that is part of every UASB. The gas/solid/liquid separator retains bacteria within the reactor vessel while allowing gas and liquid to pass through. Conventional gas/solid/liquid separators can be problematic particularly when treating wastewater containing significant amounts of solids, such as animal wastewater or food wastes.

Still others have developed bioreactors wherein relatively high concentrations of bacteria are maintained by adding fixed media, such as plastic rings or rocks, which provide locations to which the bacteria can attach. Unfortunately, these prior types of bioreactors also plug often when treating substrates like animal manure and various food processing wastes.

Anaerobic bioreactors can be an efficient and effective way to treat wastewater while generating usable biogas in the process. But these benefits of bioreactors depend on reliable operation combined with minimal maintenance and low cost of operation. Minimized maintenance is realized in large part by minimizing mechanical complexity and the tendency of gas/solid/liquid separators to plug. This is because such bioreactors are generally operated as sealed units; opening of such bioreactors for maintenance generally results in ceased operations and a time-consuming re-start process. Plugged bioreactors generally must be opened for maintenance. Various types of septums are used in bioreactors to, among other things, prevent or minimize such plugging. But effective septum designs have been elusive and largely ineffective, and have been found overly complex and thus costly in terms of maintenance and service.

Previous gas/liquid/solid separator devices have been used in high-rate anaerobic bioreactor. One of these has helped to reduce the plugging of bioreactors is a rigid or semi-rigid partition or septum and auger device that is positioned inside an enclosed bioreactor vessel, such as disclosed in U.S. Pat. No. 7,452,467. The septum generally slopes upwardly from the sides of the vessel toward a central aperture or hole so that biogas produced below the partition can move along the bottom of the septum and escape into the top of the tank where it can be removed. An auger mechanism is incorporated with the septum to force solids down below or pull solids above the septum to control the amounts of solids retained in the bioreactor vessel. A mixer may be attached to the shaft of the auger to mix the bioreactor contents and prevent a crust from forming at the top of the bioreactor. Unfortunately, experience has demonstrated that such septum/auger devices remain subject to plugging, are difficult to maintain and service, and unacceptably increase the mechanical complexity of bioreactors in which they are used. In particular, experience has demonstrated that the aperture of such a septum is subject to plugging either with or without an auger mechanism. These devices also increase the complexity of operation of the bioreactor and require a penetration through the roof of the bioreactor with a motor and gear box to facilitate a rotating auger.

There is a need, therefore, to provide a bioreactor with a septum that is resistant to plugging, that minimizes mechanical complexity, and that simplifies bioreactor maintenance. Yet another need exists to provide a bioreactor with a septum that assists in separating settling solids from the liquid or wastewater in which the settling solids are suspended. Another need exists for a septum that aids in recirculation of any solids that do not break down, and to prevent the effluent exiting the bioreactor from being plugged. Another need exists for a septum that aids in protecting against overpressure of produced biogas.

SUMMARY

The summary provided in this section summarizes one or more partial or complete example embodiments of the technologies described herein in order to provide a basic high-level understanding to the reader. This summary is not an extensive description of the technologies and it may not identify key elements or aspects of the technologies, or delineate the scope of the technologies. Its sole purpose is to present various aspects of the technologies in a simplified form as a prelude to the detailed description provided below. The technologies as a whole shall not be limited to any particular embodiment(s) or example(s) or combination(s) therefore provided herein.

This invention relates to anaerobic digestion of wastewater. More particularly, this invention relates to processes and devices to enhance and improve the anaerobic digestion process, to minimize bacteria loss and plugging, to protect against biogas overpressure, and to reduce mechanical complexity and maintenance needs. Existing septum designs tend to be mechanically complex, subject to failure and thus resulting in expensive bioreactor shutdown and maintenance, and are only marginally effective at minimizing bacteria loss and plugging. The septum and septum designs disclosed herein are significantly improved over existing septum designs. The disclosed septums are mechanically simple with no moving parts, relatively inexpensive to manufacture, and not subject to mechanical or other failure. The septums are designed to minimize the amount of bacteria that can pass through the septums and exit the bioreactor, even in turbulent wastewater. Further, the septums are designed to minimize the likelihood of clogging thus significantly reducing bioreactor down-time and maintenance costs.

The foregoing and other features, utilities, and advantages of the invention will be apparent from the following detailed description of the invention with reference to the accompanying drawings.

DESCRIPTION OF THE DRAWINGS

The detailed description provided below will be better understood when considered in connection with the accompanying drawings, where.

Like-numbered labels in different figures are typically used to designate similar or identical elements or steps in the accompanying drawings.

DETAILED DESCRIPTION

Figure 1:
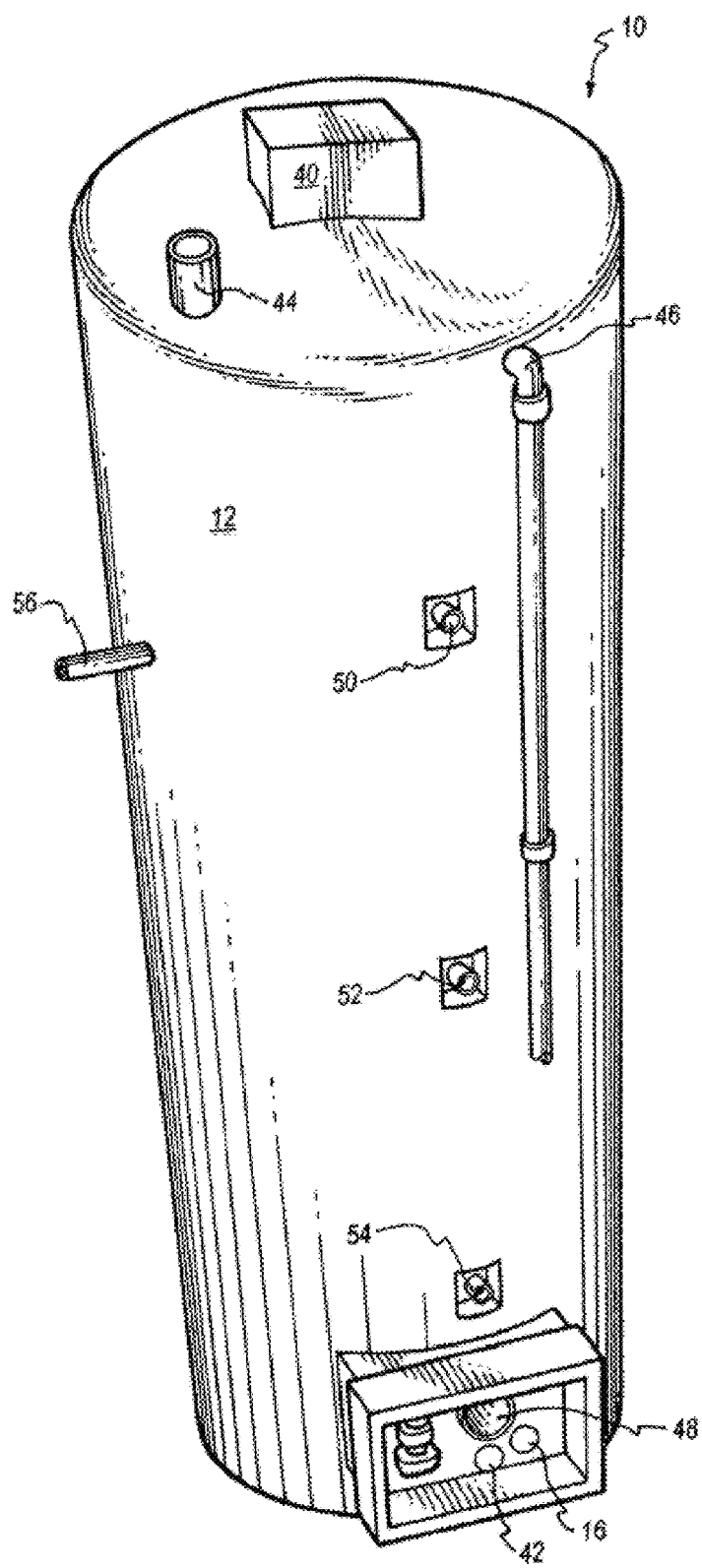
FIG. 1 is a perspective view of an example bioreactor according to the present invention.

The detailed description provided in this section, in connection with the accompanying drawings, describes one or more partial or complete example embodiments of the technologies, but is not intended to describe all possible embodiments of the technologies. This detailed description sets forth various examples of at least some of the systems and/or methods of the technologies. However, the same or equivalent technologies, systems, and/or methods may be realized according to examples as well.

The present invention relates to an anaerobic reactor 10 comprising an enclosure or vessel in which wastewater containing high concentrations of organic matter is introduced for treatment. An anaerobic reactor 10 according to the present invention is particularly applicable to wastewater generated through agricultural production and food processing.

In the anaerobic digestion process, bacteria convert carbon-containing waste products, such as byproducts of farming, ranching, or food processing, into primarily biogas that is similar to natural gas. Suspended growth anaerobic digesters, such as lagoons or enclosed vessels, that are mixed and heated do not retain bacteria. Therefore, the rate of treatment depends on how fast the bacteria can grow. For simplicity, the term "bacteria" as used herein includes acidogens (producers of volatile organic acids), methanogens (producers of methane), and other microorganisms that may not technically be classified as bacteria, such as archaeon—methanogens that are generally considered to be a primitive form of bacteria, but that may contribute to the anaerobic digestion processes along with true bacteria.

An induced bed bioreactor ("IBR") quickly forms a sludge bed within the bioreactor. A sludge bed refers to a region within a bioreactor that is thick with solids and a high concentration of living bacteria feeding on the solids. The sludge bed initially consists of various types of solid particles naturally found in biowaste, such as undigested feed or pieces of bedding. A sludge bed of this type is a haven for bacteria. The bacteria will attach to the particles of waste in the wastewater.

If the sludge bed is controlled properly, the bacteria will grow without being flushed out of the bioreactor. If the sludge bed is managed properly, it will evolve to comprise mostly living bacteria and the solids upon which the bacteria feed. When the sludge bed is trapped in a zone, the living bacteria multiply by consuming the solid, non-living material suspended in the bed and that flows up into the bed from feeding the bioreactor. Without some type of sludge bed control mechanism, however, the wastewater passing through a continuously fed bioreactor would transport bacteria out of the bioreactor with the effluent. This is not desirable because a high concentration of bacteria is necessary to effectively convert organic matter in the wastewater to biogas.

Prior bioreactors have been developed to provide a high concentration of bacteria to enhance the anaerobic digestion process. These prior bioreactors have added a fixed media, such as plastic rings or rocks, so that the bacteria have something to which they can attach. A drawback of these prior bioreactors, however, is that they soon plug when processing substrates, the food for the microorganisms, such as animal manure and many kinds of food processing wastes. They also employ no mechanism to control formation of the sludge bed.

Figure 2:
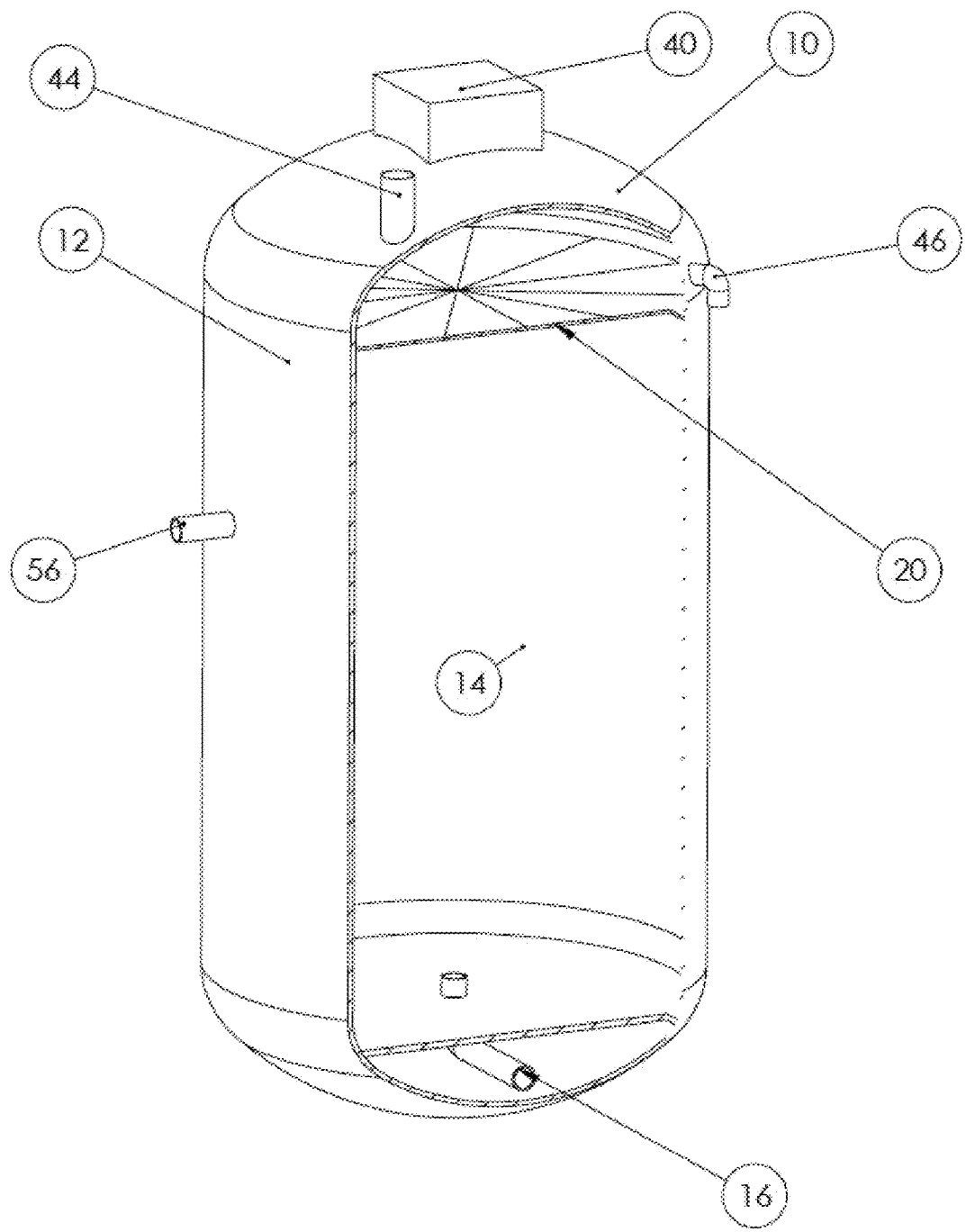
FIG. 2 is a front elevation view, including a sectional view showing interior portions, of the example bioreactor.

FIGS. 1-2 illustrate various views of example bioreactor 10 that comprises a vessel or tank 12, which typically comprises a cylindrical upstanding tank. The vessel 12 may be made of any suitable material, including but not limited to steel, plastic, or concrete. The vessel 12 provides an enclosure into which wastewater 14 is fed. In one example, the vessel 12 is round in cross section and two to five times taller than its diameter. Other examples may take on other shapes and/or proportions. The wastewater to be processed or treated in vessel 12 may comprise any type of biological waste products (also known as "substrate"), such as byproducts of farming, ranching, agriculture, food processing, or any other type of wastewater that contains high concentrations of organic matter. Wastewater 14 is typically introduced (fed into) at or near the bottom of vessel 12 through a substrate inlet 16. The introduction of wastewater containing substrates is typically known as "feeding"—that is, the wastewater is fed into the bioreactor. The wastewater may also include other waste materials, such as wood chips, bedding material, straw, baling twine, rocks, dirt, and other materials commonly found in animal manure, agricultural byproducts, and food waste.

FIG. 2 illustrates aspects of an example partition or septum 20 that is positioned inside vessel 12. In one example, septum 20 is disposed between approximately two-thirds and nine-tenths of the way up in vessel 12. The septum may be rigid or semi-rigid, and may be comprised of any suitable material, such as plastic, metal, or the like. It is also to be understood that the septum 20 may comprise a plurality of panels or parts, or may comprise a single, unitary piece of material. In another example, a plurality of septums 20 of similar or different designs may be layered one atop another. The space between layered septums may vary from two septums being stacked one immediately atop another to having any desired spacing between one septum and another, and any combination of the foregoing. In general, the objective of layering septums of similar and/or different types as described here is to maximize the degree to which bacteria are prevented from exiting the vessel 12 while at the same time minimizing clogging.

Septum 20 may also help form and maintain the sludge bed below septum 20 to retain anaerobic bacteria within the bioreactor. By retaining the anaerobic bacteria within the sludge bed area or zone, there remain more bacteria for breaking down the organics in the wastewater fed into the bioreactor. By utilizing an effective septum, such as septum 20, wastewater can be treated much faster and much more efficiently in the apparatus described in connection with the present invention as compared to other prior bioreactors. This increases efficiency of operations and reduces capital costs, required maintenance and management, and makes it easier to build and scale. The present invention also makes it much easier for an inexperienced operator to manage the anaerobic digester without having to know how the anaerobic digester actually works.

With reference again to FIG. 1, several different ports may be provided in bioreactor 10. When sludge builds up toward the bottom of the bioreactor, a port 42, which may be of any suitable size, is provided for cleaning out unwanted, sludge mixed with grit or sand or the like. A top access port 44, which may be of any suitable size, may be provided at the top of vessel 12 for added accessibility to the top of the enclosure 12. A vent or gas outlet 46 formed at the top of vessel 12 may be utilized to remove biogas generated within bioreactor 10. A lower access port 48 (closed during normal operation), which can be of any suitable size, may be provided toward the lower end of the vessel 12 for access to the lower portion of vessel 12. A recirculation port 50 may be provided to redirect sludge and/or wastewater above septum 20 to the lower portion of vessel 12, either through substrate inlet 16 or through any other return line or port (not shown). Test ports 52, 54 may be provided to test the wastewater or sludge bed at any number of locations relative to the vertical orientation of the tank. An effluent outlet 56 may be provided to remove water that has passed through the continuously fed bioreactor. Preferably, water passing through effluent outlet 56 will be treated wastewater that contains little bacteria. Cap 40 may not be significant to or required in the examples described herein. Those skilled in the art will understand that any number of other outlets or ports may be utilized in connection with the present invention without departing from the scope or spirit thereof.

Research suggests that the design of an effective septum depends on an understanding of the anaerobic digestion process and the bacteria involved in that process. The anaerobic digestion process is complex, involving various types of bacteria that work symbiotically, each playing a role in the breakdown of organics and the generation of methane. Anaerobic digestion can roughly be broken down into three stages: (1) hydrolysis, (2) acidogenesis, and (3) methanogenesis. Specific types of bacteria are typically required for each stage of the process, and are known to those skilled in the art. In one example of a properly operating anaerobic digester, hydrolyzing bacteria break down larger substrate molecules which are then further broken down by acidogens into volatile organic acids (VOAs). The VOAs are then consumed by the methanogens, which are known to produce methane as a byproduct.

Acidogens tend to be faster growing than other types of anaerobic bacteria in most situations. This means that most anaerobic digesters must be relatively lightly loaded with substrate to prevent acidogens from outgrowing the methanogens and thus producing more VOA than the methanogens can consume. If they do not, the pH will drop into the acidic range, which inhibits methanogens and builds up acid in a downward spiral until no acids are removed and the digester fails. This means that a limited amount of substrate (i.e., organic matter in wastewater) can be added to most anaerobic digesters in any given time period so that processes of hydrolysis and acid production do not outstrip the ability of methanogens to utilize the VOA and thus the pH will be maintained near the neutral range and the system is kept in balance.

Figure 3:
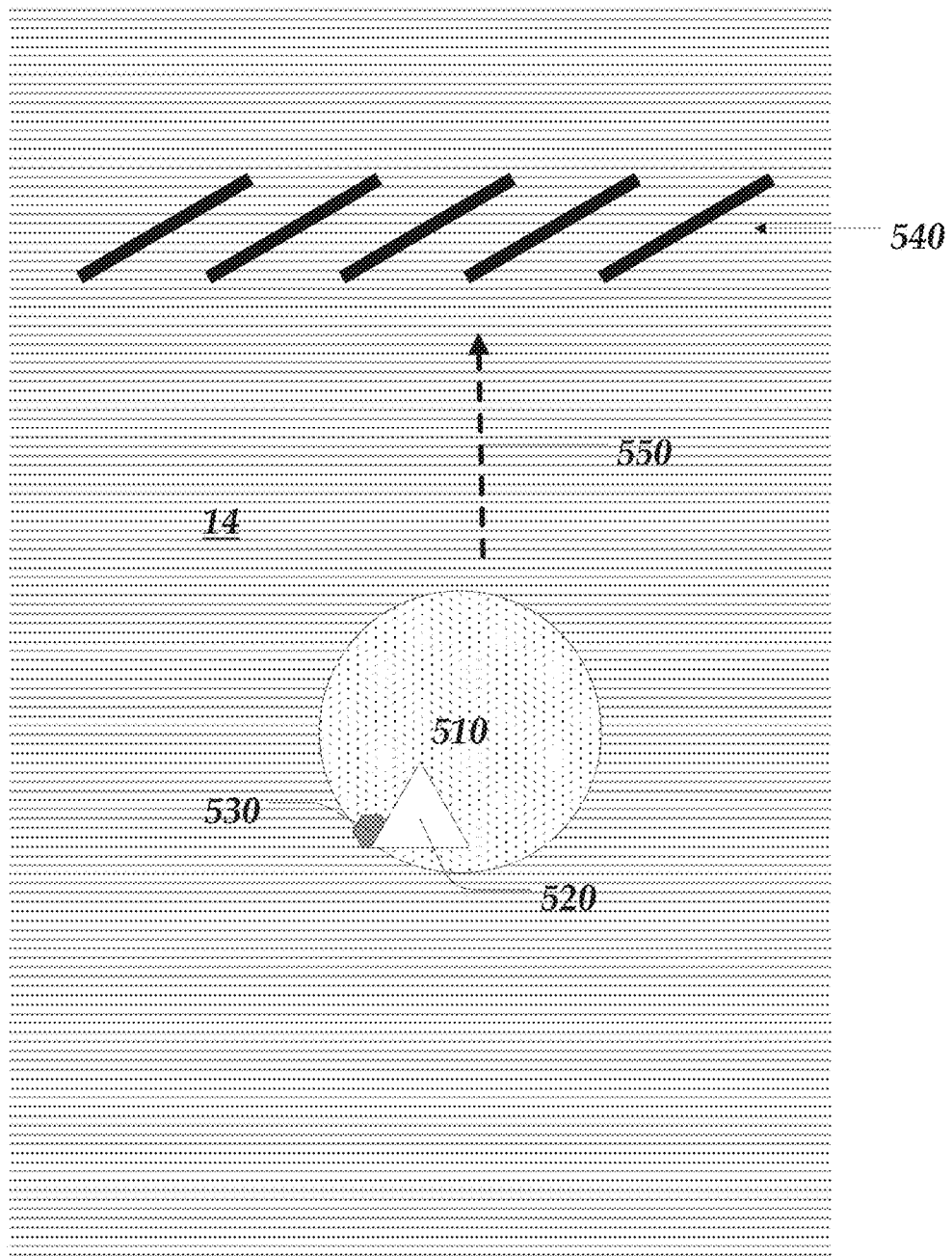
FIG. 3 is a representation of a waste particle, a bacterium, a gas bubble, and the interaction of these with a septum of the present invention.

As schematically represented in FIG. 3, a bacterium 520 will typically attach to a particle of waste 530 in wastewater 14 within an anaerobic digester. Such waste particles 530 are generally referred to herein as "substrate" that are broken down or digested by bacteria. As gas bubble 510 is produced by bacterium 520 the gas bubble tends to remain attached to the bacterium causing it and any waste particle 530 to which it is attached to rise 550 upward at some point in the gas bubble's growth. If nothing stops this upward movement, bacterium 520 may reach the top of wastewater 14 and exit vessel 12 with the effluent. Further, bacteria tend to clump together such that bacteria in a clump rise 550 together. Note that 520 may also represent a clump of bacteria, 530 multiple food particles (substrate), and 510 multiple or joined gas bubbles. Note that not all types of bacteria in an anaerobic reactor necessarily produce gas bubbles, but it is known that methanogens tend to produce methane gas bubbles.

An effective septum design will prevent or minimize rising bacteria from exiting the vessel. For example, rising bacterium/clump of bacteria 520 will bump into the septum causing any bubbles 510 to dislodge and continue upward while causing the bacteria 520 and any attached waste particles 530 to fall back into the sludge bed. On the other hand, a less-effective septum design will allow rising bacterium/clump of bacteria to exit vessel 12. For example, at least the aperture of the septum design disclosed in U.S. Pat. No. 7,452,467, may allow undesirable quantities of bacteria to exist vessel 12.

In one more effective design example, septum 20 includes example vanes 540 (not to scale) that serve to impede the upward movement of rising bacteria. As a result, rising bacterium 520 typically bump into one of the vanes such that bubble(s) 510 dislodges, allowing bacterium 520 and any attached waste particle 530 to fall back into the sludge bed, and also allowing bubble(s) 510 to pass through septum 20 and out of vessel 12 through gas outlet 46 or the like. In one example, vanes 540 of septum 20 are sized and positioned relative to each other so as to maximize the probability that rising bacteria 520 will bump into a vane thus dislodging any bubbles 510, causing the bubble-less bacteria 520 to fall back into the sludge bed before they can exit bioreactor 10.

Some types of waste fed into bioreactor 10 may also float to the top of vessel 12, including wood chips, bedding material, straw and baling twine; materials commonly found in animal manure, agricultural byproducts, and food production waste. Rocks, dirt and sand tend to sink. In addition to or instead of floating, such waste may be moved to the top of vessel 12 due to wastewater turbulence and the like in vessel 12. Such waste is referred to herein as "clogging waste" that bacteria has not yet broken down or that may not be able to break down. Such clogging waste may come in all shapes and sizes, some of which may float or rise in wastewater 14 and contribute to clogging of bioreactor 10. Given such clogging waste, vanes 540 of septum 20 are sized and oriented relative to each other so as to minimize the probability that floating waste will clog bioreactor 10, as described in more detail in connection with FIG. 4. The terms "clog" and "plug" and the like as used herein refer to a buildup(s) of clogging waste that result in a substantial reduction of the flow of the biogas produced within vessel 12. This buildup may occur in one or more ports of the bioreactor, in the septum itself, and/or in any other parts) of the bioreactor that can result in clogging. The terms "clogging" and "plugging" and the like as used herein refer to the forming of a clog or plug within vessel 12. For example, real-world usage of the septum design disclosed in U.S. Pat. No. 7,452,467 reveals that the aperture of the septum may be clogged by waste, even when using the auger and mixer components disclosed.

Figure 4:
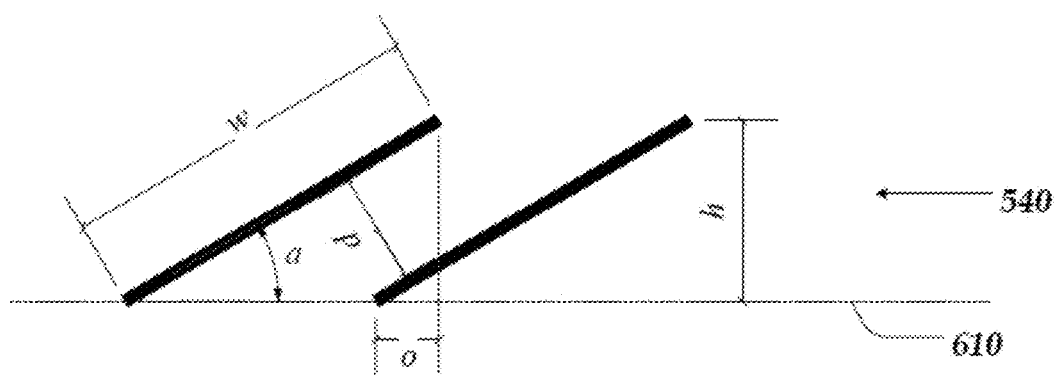
FIG. 4 illustrates a length-wise sectional view of an example pair of adjacent vanes of an example septum.

FIG. 4 illustrates a length-wise sectional view of an example pair of adjacent vanes 540 of an example septum and further illustrates characteristics of the pair that are generally shared by essentially all pairs of adjacent vanes of a more effective septum design. In particular, dimension w indicates the width of the vanes, angle a indicates the angle of the vanes relative to horizontal plane 610, dimension p indicates the parallel distance between the vanes, dimension o indicates the overlap distance of the vanes relative to horizontal plane 610, and distance h indicates the vertical height of the vanes relative to horizontal plane 610.

An effective septum will minimize bacterial loss—the amounts of bacteria that exit bioreactor 10 during operation—and will also minimize clogging of bioreactor 10. In general, as bacteria loss and clogging approach zero, the more effective septum 20 is. This effectiveness is typically a function of characteristics of adjacent pairs of the septum's vanes in terms of w, p, o, a, and h. In one example, for an effective septum design, each vane is substantially w in width and is oriented at angle a relative to imaginary horizontal plane 610 of septum 20 on which a lower edge of each vane is situated. Any two adjacent vanes are physically oriented relative to each other such that vane width w, angle a, and parallel distance p provide a minimum overlap distance o. Parallel distance p is typically selected to be greater than the maximum rigid dimension of clogging waste anticipated to enter bioreactor 10. Further, vane width w, angle a, and parallel distance p are typically selected to provide at least a minimum overlap distance a that is greater than zero. In one example, dimension w is one to three times the parallel distance p, angle a is 45 degrees or less, and the overlap distance a is zero and three-fourths the width w. The term "maximum rigid dimension of clogging waste" typically refers a cross-sectional dimension of clogging waste that is sufficiently large and rigid to cause the waste to lodge between vanes or the like of a septum. For example, consider a clogging waste cross-section with a maximum rigid dimension that is greater than p, such a maximum rigid dimension is considered sufficient to cause the waste to lodge between vanes or the like of a septum. Alternatively, consider a clogging waste cross-section with a maximum dimension that is greater than p but that is not sufficiently rigid. Such clogging waste may deform along the dimension due to its lack of rigidity such that it will not lodge between vanes or the like of a septum. Thus, the term refers to both sufficient dimension and rigidity for lodging between vanes or the like of a septum.

In another example, the minimum overlap distance o is selected to be sufficient to maximize the probability that rising bacteria that reach the septum will bump into a vane as opposed to passing through the septum un-obstructed, thus causing any bubbles to dislodge and the bacteria to fall back into the sludge bed as opposed to exiting bioreactor 10 in the effluent. Note that the rise of floating bacteria may not be 100% vertical; turbulence and currents and the like in the wastewater may cause at least horizontal movement of rising bacteria. Thus, in one example, the minimum overlap distance o is selected to be greater than the anticipated horizontal movement of rising bacteria over distance h.

Given that parallel distance p has a significant influence on vane width w and overlap distance o, and given that parallel distance p is generally selected to be greater than the maximum rigid dimension of clogging waste anticipated to enter bioreactor 10, in one example a macerator 710 is coupled to inlet 16 through which the substrate 722 enters bioreactor 10. Macerators, as known by those skilled in the art, are used to break up solids and the like, such as substrate 722, so as to substantially ensure the maximum size of any solids or the like passing through the macerator. Thus, a macerator(s) can be used to limit the maximum rigid dimension of substrate (including clogging waste) that enters bioreactor 10 to a particular maximum size.

Note that in certain configurations the vane width w may vary along the length of the vanes, such as in the radial vane configuration detailed below. In other septum configurations, such as the linear and concentric vane configurations detailed below, the vane width w may remain substantially constant over the length of the vanes.

In some examples, septum 20 may be conical in shape; that is, raised from the side walls of the vessel 12 to septum apex 80. For example, the elevation between the periphery of septum 20 and septum apex 80 may be approximately ten to twenty inches. However, according to other examples, the elevation between the periphery of septum 20 at the walls of the vessel 12 and a septum apex may be relatively shallow. For example, according to some embodiments, the elevation between the periphery of septum 20 and the apex may be approximately one to three inches. A more flat or shallow septum 20 may facilitate higher bacteria concentrations in the vessel 12 by holding more of the bacteria in the lower portion 750 of vessel 12.

Figure 5:
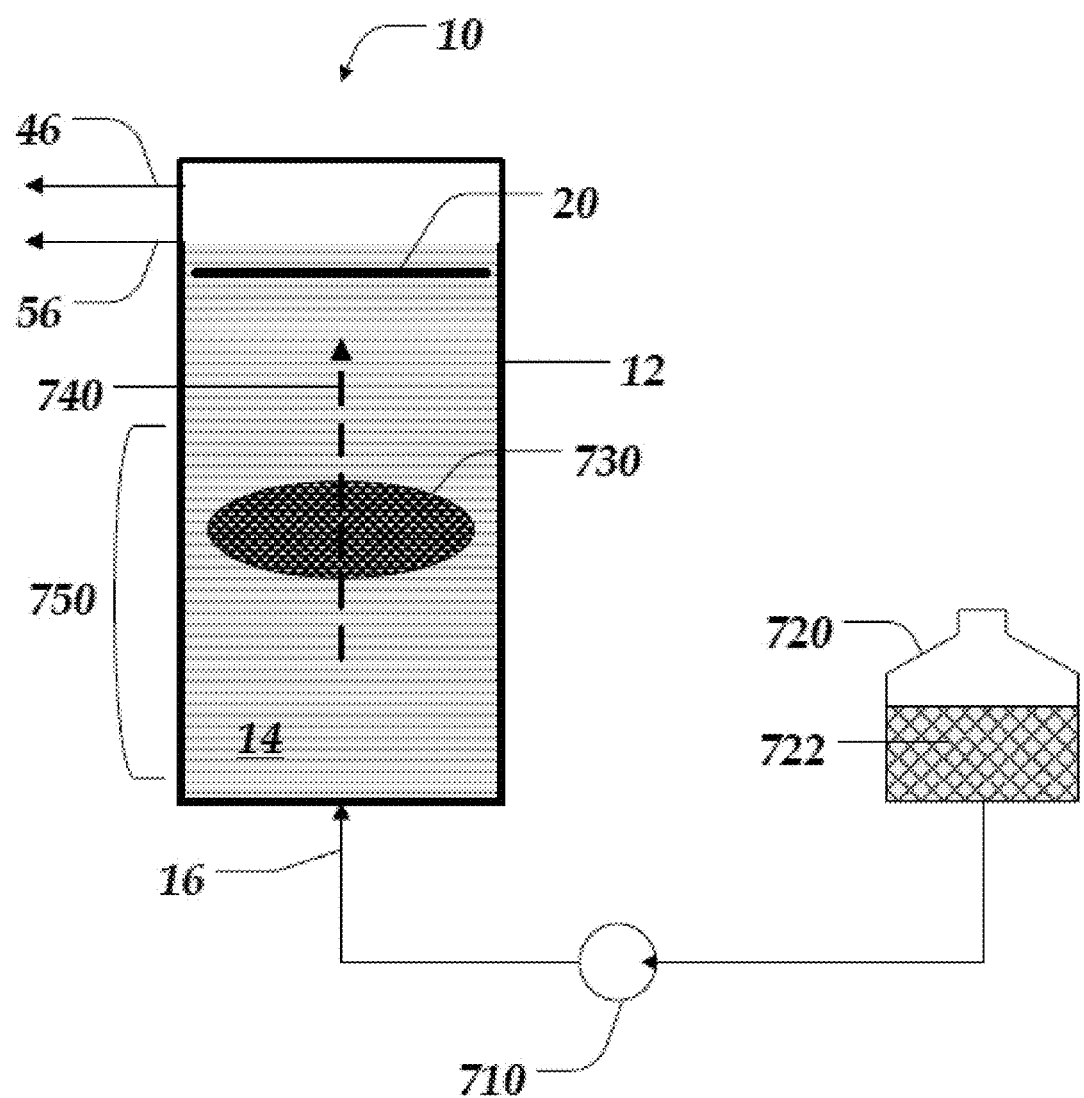
FIG. 5 illustrates a schematic diagram of examples including bioreactor and substrate tank.

FIG. 5 illustrates a schematic diagram of examples including bioreactor 10 and substrate tank 720 comprising substrate 722 that is fed into vessel 12 via substrate inlet 16 through a macerator 710 which breaks up the substrate so as to limit the maximum rigid dimension of substrate 722 (including any clogging waste in the substrate) that enters bioreactor 10 to a particular maximum size. Further illustrated is a representation of a sludge bed 730 induced in a lower portion 750 of vessel 12 and suspended in wastewater 14. The lower portion 750 of vessel 12 is located in an area of vessel 12 below effluent outlet 56 and septum 20 and further located in the area of vessel 12 above substrate inlet 16. Arrow 740 indicates an overall up-flow generated in wastewater 14 from substrate 722 entering vessel 12 through inlet 16, effluent exiting vessel 12 via effluent outlet 56 and biogas 12 rising in wastewater 14 and exiting vessel 12 via biogas outlet 46. Septum 20 is typically situated within wastewater 14 above inlet 16 and sludge bed 730 (i.e., above lower portion 750) and below effluent outlet 56. In one example, septum 20 operates to retain sludge bed 730 in lower portion 750 while minimizing bacteria loss from and clogging of bioreactor 10. In other examples, multiple septums (typically oriented one above another) are so used.

Figure 6:
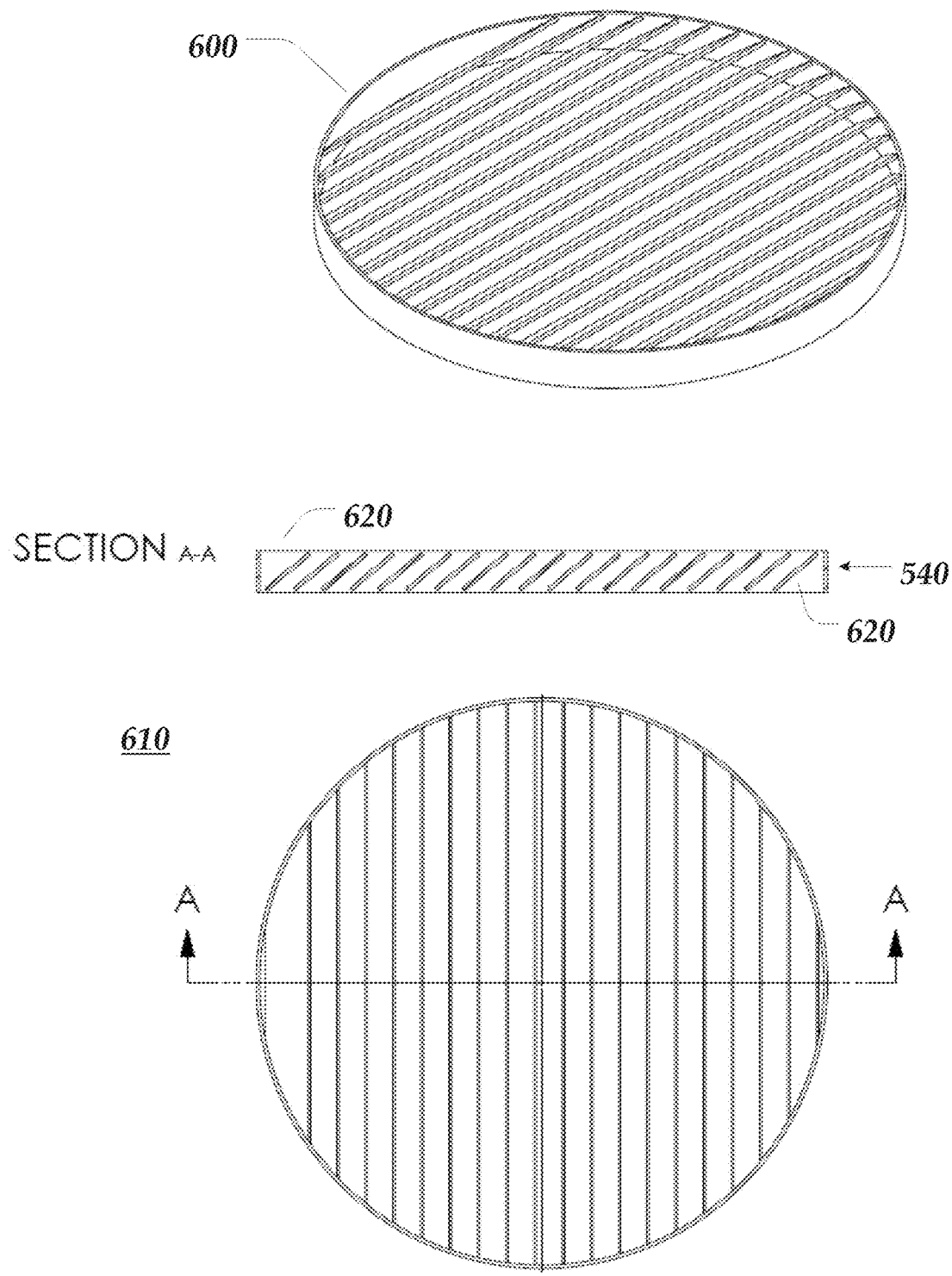
FIG. 6 illustrates an example septum based on a linear vane design.

FIG. 6 illustrates an example septum 600 based on a linear vane design, which is a specific type of example septum 20. An example three-dimensional view 600 of a linear-vane septum is illustrated. In this example design, the vanes are substantially straight and are oriented so as to be substantially parallel to each other, as can be seen in the top and sectional views of illustration 610. In particular with this linear vane design, the characteristics of the adjacent pairs of vanes 540 are maintained consistent with those described in connection with FIG. 4. Further, the septum ends 620 are typically plugged or otherwise structured so as to not allow rising bacteria to pass through the septum 700 unobstructed consistent with the considerations discussed with respect to FIG. 4.

Figure 7:
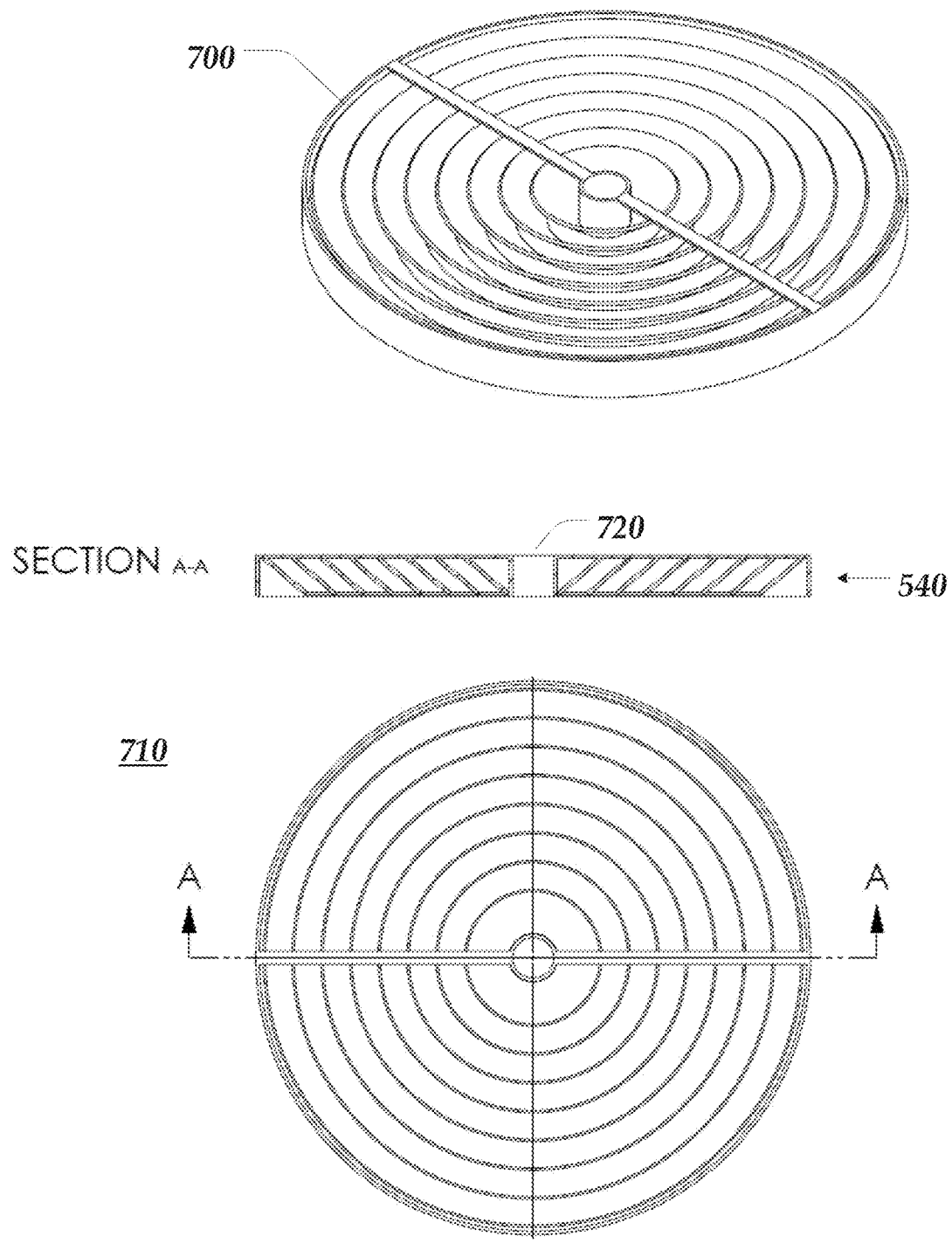
FIG. 7 illustrates an example septum based on a concentric vane design.

FIG. 7 illustrates an example septum 700 based on a concentric vane design, which is a specific type of example septum 20. An example three-dimensional view 700 of a concentric-vane septum is illustrated. In this example design, the vanes are oriented in concentric circles, as can be seen in the top and sectional views of illustration 710. In particular with this concentric vane design, the characteristics of the adjacent pairs of vanes 540 are maintained consistent with those described in connection with FIG. 4. Further, the septum center region 720 is typically plugged or otherwise structured so as to not allow rising bacteria to pass through the septum 700 unobstructed consistent with the considerations discussed with respect to FIG. 4.

Figure 8:
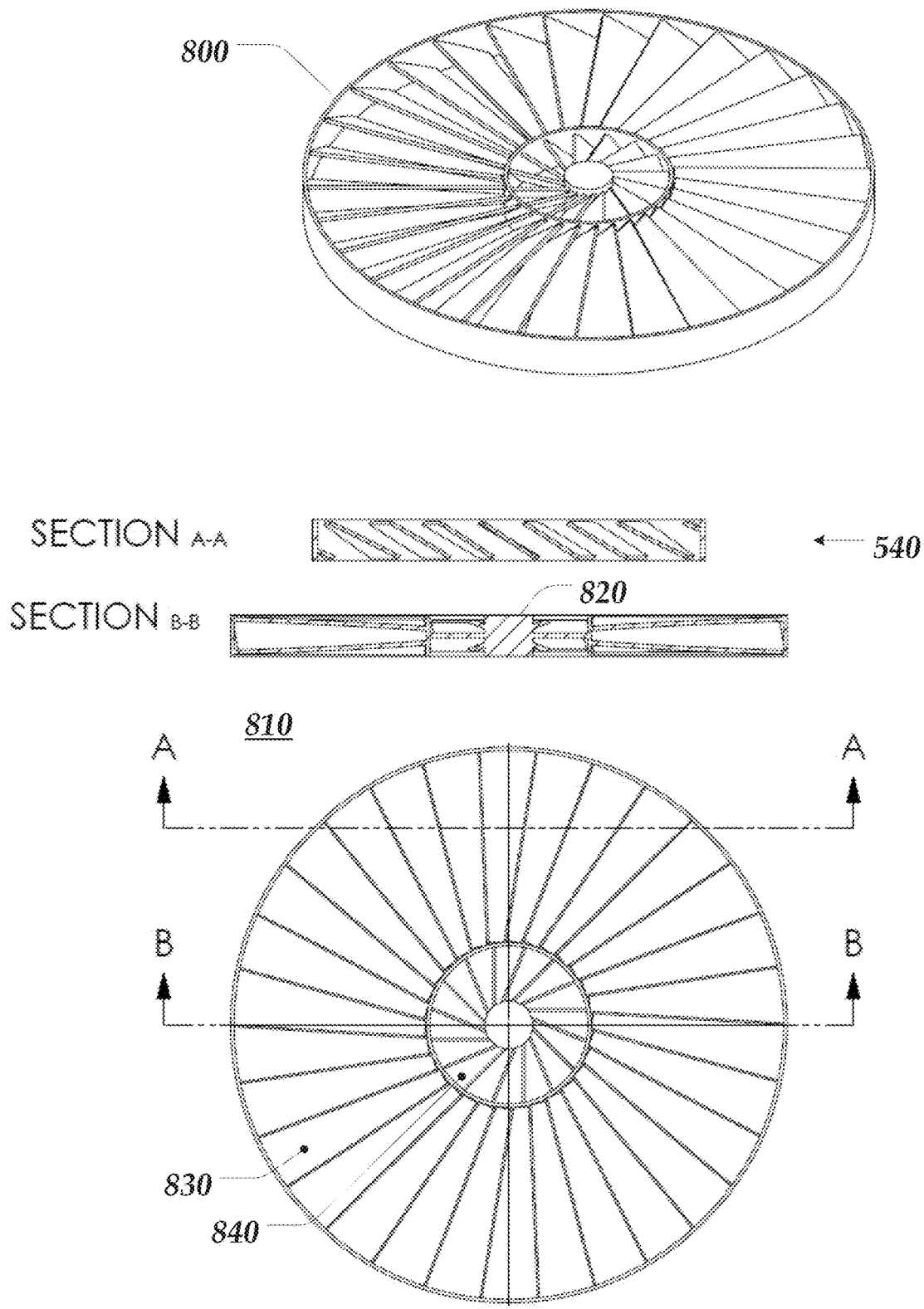
FIG. 8 illustrates an example septum 800 based on a radial vane design.

FIG. 8 illustrates an example septum 800 based on a radial vane design, which is a specific type of example septum 20. An example three-dimensional view 800 of a radial-vane septum is illustrated. In this example design, the vanes are oriented so as to extend out radially from the center region of each section to an outside edge of the section, as can be seen in the top and sectional views of illustration 810. In particular, with this radial vane design, the characteristics of the adjacent pairs of vanes 540 are maintained consistent with those described in connection with FIG. 4. Further, the septum center region 820 is typically plugged or otherwise structured so as to not allow rising bacteria to pass through the septum 800 unobstructed consistent with the considerations detailed with respect to FIG. 4.

In addition, a radial-vane septum 800 may include one or more sections, such as example sections 830 and 840 illustrated in FIG. 8. The number of sections in the radial vane design typically depends on the length of the vanes with respect to a maximum desired septum height h. Note that in the radial vane design the vanes are not actually parallel. Instead, the distance p increases between the vanes over their length from a section center region to a section outside edge. As the vanes become longer their widths w and/or angles a typically need to increase/change so as to maintain the minimum overlap distance o of the characteristics of adjacent pairs of vanes 540 described in connection with FIG. 4. As the length of the vanes increase, the vane width w may become sufficiently large so as to increase the height h of the septum 800 greater than is desirable. To avoid this problem, any number of additional sections can be implemented in a single septum. In general, the number of sections implemented would be at least the number required to not exceed a desired septum height h while still maintaining the adjacent vane characteristics described in connection with FIG. 4.

Figure 9:
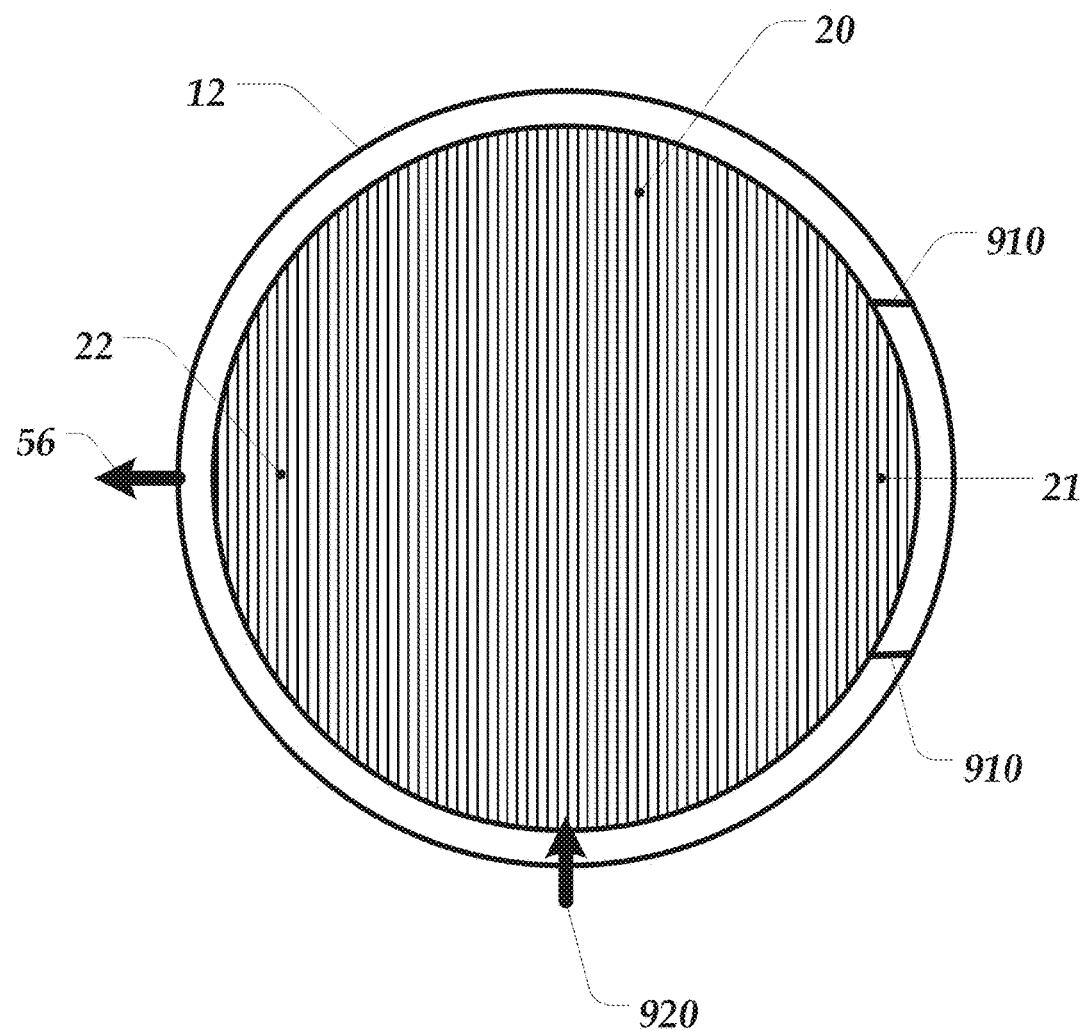
FIG. 9 illustrates an example attachment scheme for attaching a septum 20 to the inside of a vessel.

FIG. 9 illustrates an example attachment scheme for attaching a septum 20 to the inside of a vessel. In general, one or more attachment device 910 is used to attach septum 20 to the inside of vessel 12. Side 21 of septum 20 indicates its attachment side. Side 22 of septum 20 indicates its free side. In one example, the center region of the point(s) of attachment on attachment side 21 of septum 20 to the inside of vessel 12 is typically substantially opposite effluent outlet 56.

Attachment device(s) 910 may be fabricated from wire, chain, plastic, or any other material that meets the following requirements. Attachment device(s) 910 are sufficiently flexible to allow septum 20 to move and pitch within or upon wastewater 14 in any turbulence or the like such that the movement of free side 22 may allow any clogging waste floating under septum 20 to exit effluent outlet 56. Further, attachment device(s) 910 are sufficient in number, location, and design so as to prevent septum 20 from flipping over or otherwise failing in its purpose to prevent or minimize rising bacteria from exiting the vessel 12. Further, attachment device(s) 910 are also sufficiently robust so as to provide long-term mechanical reliability without breakage or failure of the device(s) 910. For example, attachment device(s) 910 may be fabricated from stainless steel chain or the like and permanently or irremovably attached to vessel 12 and septum 20 via any suitable means.

FIG. 9 also illustrates an example optional jet 920 such as a water jet oriented so as to flush any clogging waste from septum 20. Typically, such water jets are optionally oriented around the inside wall and/or at various locations at the top of vessel 12 with their high-pressure outlet nozzles aimed at various portions (e.g., top and/or bottom) of septum 20 or any number of septums within vessel 12 so as to spray across and/or into and/or through the vanes of the septum(s). The jets may be controlled separately and/or in groups and/or all together so as to flush any clogging waste from septum 20, thus cleaning septum 20 of any built-up clogging waste or any other debris or the like. Various such jets may be mounted inside vessel 12 and/or pass through the outer surface of vessel 12. In one example, such jets are connected to an inlet pipe(s) that provides water or the like to the inlet side of the jets. In another example, one or more such jets is aimed at a site glass mounted in the side of vessel 12 so as to clear the glass of any visual obstructions or the like. The water or the like fed to the jet inlets may be potable water from an external source and/or may be liquid taken from inside vessel 12, and is typically cleaned (e.g., filtered or the like) sufficiently so as to not clog the jets. In addition to flushing clogging waste or the like from a septum(s), the jet(s) may also be oriented so as to move such waste toward effluent outlet 56.

While this invention has been described with reference to certain specific embodiments and examples, those skilled in the art will recognize that many variations are possible without departing from the scope and spirit of this invention. The invention, as defined by the claims, is intended to cover all changes and modifications of the invention which do not depart from the spirit of the invention. The words "including" and "having," as used in the specification, including the claims, shall have the same meaning as the word "comprising."

The invention claimed is:

1. An induced bed bioreactor ("IBR") comprising:
    a vessel configured to hold a mixture comprising fluid, substrate, and bacteria, and to induce a sludge bed in a lower portion of the vessel, where the sludge bed comprises at least a portion of the substrate and at least a portion of the bacteria;
    an outlet coupled to the vessel above the lower portion and configured to release biogas produced within the vessel;
    an inlet coupled to the vessel beneath the lower portion and configured to receive the substrate; and
    a septum coupled to the vessel so as to be oriented between the lower portion and the outlet, the septum comprising a plurality of vanes configured to minimize bacteria loss from the IBR and to minimize clogging of the IBR based on an orientation of each adjacent pair of the plurality of vanes, where the orientation comprises maintaining:

a distance p between the each adjacent pair of vanes that is greater than a maximum rigid dimension of clogging waste anticipated to enter the IBR; and a minimum overlap distance o that is greater than zero.

2. The IBR of claim 1 further comprising a macerator coupled to the inlet via which the maximum rigid dimension of clogging waste fed into the vessel is limited to a particular maximum size, where the distance p is substantially the same as or greater than the particular maximum size.

3. The IBR of claim 1 further comprising a second septum layered atop the septum.

4. The IBR of claim 1 where the septum is a linear vane septum.

5. The IBR of claim 1 where the septum is a concentric vane septum.

6. The IBR of claim 1 where the septum is a radial vane septum.

7. The IBR of claim 1 further comprising:

an effluent outlet; and at least one attachment device that attaches the septum to the inside of the vessel at one or more attachment points, a center region of which is substantially opposite the effluent outlet.

8. An induced bed bioreactor septum comprising a plurality of vanes configured to minimize bacteria loss from an induced bed bioreactor ("IBR") and to minimize clogging of the IBR based on an orientation of each adjacent pair of the plurality of vanes, where the orientation comprises maintaining:

a distance p between the each adjacent pair of vanes that is greater than a maximum rigid dimension of clogging waste anticipated to enter the IBR; and a minimum overlap distance o that is greater than zero.

9. The IBR septum of claim 8 where the vanes are oriented according to a linear vane design in which the vanes are substantially straight and are oriented so as to be substantially parallel to each other.

10. The IBR septum of claim 8 the vanes are oriented according to a concentric vane design in which the vanes are oriented in concentric circles.

11. The IBR septum of claim 8 the vanes are oriented according to a radial vane design comprising one or more sections in which vanes of the plurality of vanes of each of the one or more sections are oriented so as to extend out radially from a center region of the each of the one or more sections to an outside edge of the each of the one or more sections.

12. The IBR septum of claim 8 where the minimum overlap distance o is a function of a width w and an angle $\alpha$ of each of the vanes.

13. A method performed in an induced bed bioreactor ("IBR") for minimizing bacteria loss from and plugging of the IBR, the method comprising:

feeding substrate into a vessel of the IBR via a substrate inlet located below a lower portion of the vessel;

producing biogas from at least a portion of the substrate via anaerobic digestion occurring within the vessel, where the biogas is largely produced within a sludge bed that is induced and suspended in the lower portion of the vessel within wastewater, where the produced biogas passes through a septum and exits the vessel via a biogas outlet, where the septum is positioned within the wastewater between the lower portion of the vessel and a top of the wastewater; and where the septum comprises a plurality of vanes; and minimizing the bacteria loss from and the plugging of the IBR based on an orientation of each adjacent pair of the plurality of vanes, where the orientation comprises maintaining:

a distance p between the each adjacent pair of vanes that is greater than a maximum rigid dimension of clogging waste anticipated to enter the IBR; and a minimum overlap distance o that is greater than zero.

14. The method of claim 13 further comprising receiving the fed substrate into the vessel via a macerator coupled to the substrate inlet via which the maximum rigid dimension of clogging waste fed into the vessel is limited to a particular maximum size, where the distance p is substantially the same as or greater than the particular maximum size.

15. The method of claim 13 where a second septum is layered atop the septum.

16. The method of claim 13 where the septum is a parallel vane septum.

17. The method of claim 13 where the septum is a concentric vane septum.

18. The method of claim 13 where the septum is a radial vane septum.

19. The method of claim 13 where at least one attachment device attaches the septum to the inside of the vessel at one or more attachment points, a center region of which is substantially opposite an effluent outlet.

20. The method of claim 19 where movement of the attached septum allows clogging waste floating under the septum to exit the vessel via the effluent outlet.

* * * * *